(12) United States Patent
Deng et al.

(10) Patent No.: US 10,415,769 B2
(45) Date of Patent: Sep. 17, 2019

(54) METHOD FOR ADAPTING LED LAMP TUBE TO FLUORESCENT LAMP TUBE HOLDER, LED LAMP TUBE HOLDER AND ILLUMINATION DEVICE

(71) Applicant: SHENZHEN XINGRISHENG INDUSTRIAL CO., LTD., Shenzhen, Guangdong Province (CN)

(72) Inventors: Peixing Deng, Shenzhen (CN); Xiuqi Li, Shenzhen (CN)

(73) Assignee: SHENZHEN XINGRISHENG INDUSTRIAL CO., LTD. (CN)

(*) Notice: Subject to any disclaimer, the term of this patent is extended or adjusted under 35 U.S.C. 154(b) by 696 days.

(21) Appl. No.: 14/785,596

(22) PCT Filed: Apr. 19, 2013

(86) PCT No.: PCT/CN2013/074474
§ 371 (c)(1),
(2) Date: Oct. 19, 2015

(87) PCT Pub. No.: WO2014/169490
PCT Pub. Date: Oct. 23, 2014

(65) Prior Publication Data
US 2016/0084448 A1   Mar. 24, 2016

(51) Int. Cl.
| F21K 9/00 | (2016.01) |
| F21K 9/90 | (2016.01) |
| H01R 33/08 | (2006.01) |
| F21V 19/00 | (2006.01) |
| F21K 9/272 | (2016.01) |

(Continued)

(52) U.S. Cl.
CPC ............... *F21K 9/90* (2013.01); *F21K 9/272* (2016.08); *F21V 19/003* (2013.01); *F21V 19/008* (2013.01); *F21V 19/009* (2013.01); *H01R 33/0836* (2013.01); *F21Y 2103/10* (2016.08);
(Continued)

(58) Field of Classification Search
CPC .......................................... F21K 9/27–9/272
See application file for complete search history.

(56) References Cited

U.S. PATENT DOCUMENTS

2009/0159919 A1* 6/2009 Simon ..................... F21K 9/175
257/99
2012/0293991 A1* 11/2012 Lin ......................... F21K 9/272
362/225

(Continued)

*Primary Examiner* — Gerald J Sufleta, II
(74) *Attorney, Agent, or Firm* — PROI Intellectual Property US (57) ABSTRACT

A method for adapting an LED lamp tube to a fluorescent lamp tube holder, an LED lamp tube holder and an illumination device. The LED lamp tube holder comprises an adaptation bracket and a lamp tube holding clip which is connected to the adaptation bracket. The lamp tube holding clip has a circular-arc cylindrical holding surface, thereby being clamped to the outer wall of a light transmission tube of the LED lamp tube. A cylindrical pin which axially extends from the LED lamp tube holder along the light transmission tube is arranged on the adaptation bracket. The shape of the pin is the same as that of an electrically-conductive pin of the fluorescent lamp tube, thereby enabling the LED lamp tube holder to be arranged in the fluorescent lamp tube holder. The LED lamp tube can be arranged on the basis of the original LED lamp tube holder.

8 Claims, 6 Drawing Sheets

(51) Int. Cl.
*F21Y 103/10* (2016.01)
*F21Y 115/10* (2016.01)

(52) U.S. Cl.
CPC ......... *F21Y 2115/10* (2016.08); *Y02B 20/386* (2013.01)

(56) References Cited

U.S. PATENT DOCUMENTS

2012/0307524 A1* 12/2012 Schapira ............ H01R 13/7175
362/652
2014/0177203 A1* 6/2014 Novak .................... F21S 8/036
362/95

* cited by examiner

METHOD FOR ADAPTING LED LAMP TUBE TO FLUORESCENT LAMP TUBE HOLDER, LED LAMP TUBE HOLDER AND ILLUMINATION DEVICE

CROSS-REFERENCE TO RELATED APPLICATION

This Application is a Section 371 National Stage Application of International Application No. PCT/CN2013/074474, filed Apr. 19, 2013 and published as WO 2014/169490 on Oct. 23, 2014, not in English, the contents of which are hereby incorporated by reference in their entirety.

TECHNICAL FIELD

The present invention relates to an illumination device and its adaptation method, especially to an adaptation method of two types of lamps and a device for implementing such method.

BACKGROUND ART

With their environmental protection and energy saving features, LED lamps become more and more popular. In this case, there is a problem of replacing original illumination lamps.

Figure 16:
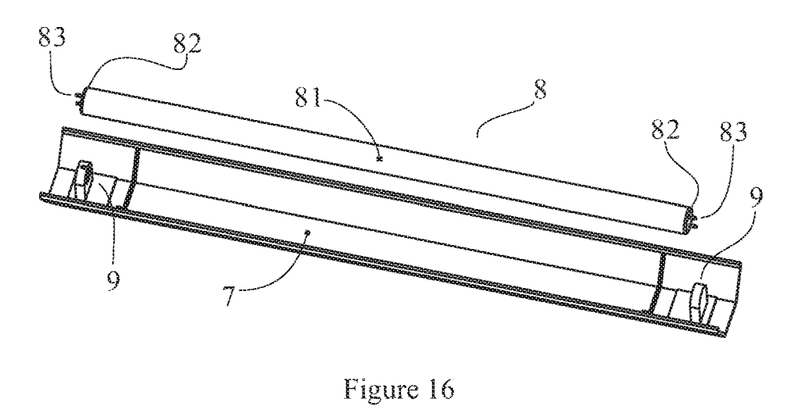
FIG. 16 is a schematic diagram for axonometric projection of a fluorescent illumination lamp including a fluorescent lamp tube 8, a fluorescent lamp holder 9 and a lamp shade 7 in the prior art.

Fluorescent lamps are considerably dominant in the original lamp market and used in many occasions. As shown in FIG. 16, a fluorescent lamp comprises a fluorescent lamp tube 8 and a fluorescent lamp tube holder 9. The fluorescent lamp tube 8 includes a straight lamp tube body 81 and two interface covers 82 arranged at both ends of said lamp tube body 81 respectively. At least one interface cover 82 is provided with two cylindrical conductive pins 83 which axially extend from such interface cover 82 along said lamp tube body 81. For most fluorescent lamp tubes, two electrically-conductive pins 83 are installed on said interface covers 82 at both ends respectively. The original fluorescent lamp tube holder 9 is just suitable for installing said fluorescent lamp tube 8. In the prior art, said fluorescent lamp tube holder 9 is usually called T8 lamp holder or T5 lamp holder. "T" is short for "Tube", and the number after "T" represents that the diameter of the fluorescent lamp tube 8 adapted to the fluorescent lamp tube holder 9 is a multiple of ⅛ inch. T8 lamp holder, i.e. a 25.4 mm-diameter fluorescent lamp tube holder, is adapted to a 8×⅛-inch-diameter fluorescent lamp tube; T5 lamp holder, i.e. a 15.87 mm-diameter fluorescent lamp tube holder, is adapted to a 5×⅛-inch-diameter fluorescent lamp tube. In the existing technology, a tubular LED illumination lamp is used to replace an original straight fluorescent lamp tube 8, to which said fluorescent lamp tube holder 9 is adapted is usually completely dismantled. In most cases, said fluorescent illumination lamp also includes a lamp shade 7, so said lamp shade 7 is also required to be removed and then a tubular LED illumination lamp used in the prior art is installed. Obviously, the replacement of fluorescent illumination lamps by tubular LED illumination lamps in the prior art enables many lamp shades 7 and fluorescent lamp tube holders 9 to be replaced, thereby causing great waste. Even if these lamp shades 7 and fluorescent lamp tube holders 9 are recycled, it is required to use a lot of manpower and material resources. Therefore, the replacement of fluorescent illumination lamps by tubular LED illumination lamps in the prior art is costly.

CONTENT OF THE INVENTION

To solve the deficiencies of the prior art, the present invention provides a method for using an original fluorescent lamp holder to replace a fluorescent lamp tube by a LED illumination lamp, and a LED lamp tube holder and a LED illumination device for implementing such method, thereby greatly reducing the replacement cost of these two kinds of illumination lamps.

The invention can solve the said technical issues with the following technical proposals:

Implement a method for adapting a LED lamp tube to a fluorescent lamp tube holder. Said fluorescent lamp tube holder is suitable for installing a fluorescent lamp tube and provides a power interface for said fluorescent lamp tube. Said fluorescent lamp tube includes a straight lamp tube body and two interface covers arranged at both ends of said lamp tube body respectively. At least one interface cover is provided with two cylindrical conductive pins which axially extend from such interface cover along said lamp tube body. Said LED lamp tube includes a light transmission tube with a built-in LED lamp body. Said method consists of the following steps:

A. At least one LED lamp tube holder including an adaptation bracket and a lamp tube holding clip is used; said lamp tube holding clip is used to clamp the outer wall of a light transmission tube of said LED lamp tube, and said adaptation bracket is provided with a cylindrical pin which axially extends from said LED lamp tube holder along said light transmission tube; the shape of said pin is the same as that of an electrically-conductive pin of said fluorescent lamp tube.

B. Said LED lamp tube is installed on the fluorescent lamp tube holder through said LED lamp tube holder described in Step A.

Step B includes the following sub-steps:

B11. At least one end of a light transmission tube of said LED lamp tube is embedded or clamped in a lamp tube holding clip of said LED lamp tube holder, ensuring that said lamp tube holding clip firmly clamps said light transmission tube.

B12. Said LED lamp tube which clamps the LED lamp tube holder is installed in said fluorescent lamp tube holder through the pin of an adaptation bracket of said LED lamp tube holder.

Specifically, said fluorescent lamp tube holder comprises a bracket with a recess and a cylindrical pin connecting turntable which is rotatably installed in said recess. Said recess has a cylindrical surface internal wall. Said adaptation bracket is processed with a pin leading-in groove which forms a vertical wall of said recess, and said pin connecting turntable is also processed with a pin slot which runs through said pin connecting turntable. For said fluorescent lamp tube holder, Step B12 has the following sub-steps:

B121. Said pin connecting turntable is rotated to enable its pin slot and said pin leading-in groove on the bracket to interpenetrate.

B122. The pin of an adaptation bracket of said LED lamp tube holder is pressed from the pin leading-in groove of a bracket of said fluorescent lamp holder into a pin slot of said pin connecting turntable.

B123. The LED lamp tube which clamps said LED lamp tube holder is rotated to make the pin leading-in groove of a bracket of said fluorescent lamp holder and the pin slot of said pin connecting turntable unable to interpenetrate so that said LED lamp tube is installed in said fluorescent lamp tube holder.

In addition, Step B also includes the following sub-steps:

B21. Said LED lamp tube holder is installed in said fluorescent lamp tube holder through the pin of an adaptation bracket of said LED lamp tube holder.

B22. At least one end of a light transmission tube of said LED lamp tube is embedded or clamped in a lamp tube holding clip of said LED lamp tube holder described in Step B21, ensuring that said lamp tube holding clip firmly clamps said light transmission tube.

In Steps B21~B22 above, said fluorescent lamp tube holder comprises a bracket with a recess and a cylindrical pin connecting turntable which is rotatably installed in said recess. Said recess has a cylindrical surface internal wall. Said bracket is processed with a pin leading-in groove which forms a vertical wall of said recess, and said pin connecting turntable is also processed with a pin slot which runs through said pin connecting turntable. In this case, Step B21 includes the following sub-steps:

B211. Said pin connecting turntable is rotated to enable its pin slot and said pin leading-in groove on the bracket to interpenetrate.

B212. The pin of an adaptation bracket of said LED lamp tube holder is pressed from the pin leading-in groove of a bracket of said fluorescent lamp holder into a pin slot of said pin connecting turntable.

B213. The LED lamp tube holder is rotated to make the pin leading-in groove of a bracket of said fluorescent lamp holder and the pin slot of said pin connecting turntable unable to interpenetrate so that said LED lamp tube holder is installed in said fluorescent lamp tube holder.

The invention can also solve the said technical issues with the following technical proposals:

A LED lamp tube holder for adapting a LED lamp tube to a fluorescent lamp tube holder is designed and manufactured, wherein said fluorescent lamp tube holder is suitable for installing a fluorescent lamp tube and provides a power interface for said fluorescent lamp tube. Said fluorescent lamp tube includes a straight lamp tube body and two interface covers arranged at both ends of said lamp tube body respectively. At least one interface cover is provided with two cylindrical conductive pins which axially extend from such interface cover along said lamp tube body. Said LED lamp tube includes a light transmission tube with a built-in LED lamp body. Especially, said LED lamp tube holder comprises an adaptation bracket and a lamp tube holding clip which is connected to said adaptation bracket. Said lamp tube holding clip has a circular-arc cylindrical holding surface, thereby enabling being clamped to the outer wall of a light transmission tube of said LED lamp tube. A cylindrical pin which axially extends from the LED lamp tube holder along said light transmission tube is arranged on said adaptation bracket; the shape of said pin is the same as that of an electrically-conductive pin of said fluorescent lamp tube, thereby enabling the LED lamp tube holder to be arranged in the fluorescent lamp tube holder.

To ensure that said lamp tube holding clip firmly clamps a light transmission tube of said LED lamp tube, the cross section of the holding surface of said lamp tube holding clip presents a circular arc shape, and the central angle "α" between radius lines which pass through two endpoints of such circular arc is less than 170 degree.

Specifically, said LED lamp tube holder also includes an extension connecting base with a circular-arc cylindrical inner surface. Said extension connecting base is formed by axially extending the bottom of a lamp tube holding clip along the holding surface of such lamp tube holding clip. The end of said extension connecting base is connected to said adaptation bracket.

More specifically, the holding surface of said lamp tube holding clip and the inner surface of said extension connecting base have a circular-arc cross section, and the central angle of the cross section of said holding surface is greater than that of said inner surface. The central angle of said cross section refers to the included angle between radius lines which pass through two endpoints of such circular arc.

In order for the power line of a LED lamp tube to be easily laid, said adaptation bracket assumes a flat plate shape and the bottom surface of said adaptation bracket presents a circular-arc cylindrical surface shape so that the bottom surface of said adaptation bracket is connected to the inner surface at the end of said extension connecting base, thereby forming two grooves among said adaptation bracket, said extension connecting base and said lamp tube holding clip.

To enhance the mechanical strength, said LED lamp tube holder also includes a triangular prism-shaped reinforcing rib, the cross section of which presents a right triangle shape. Two mutually perpendicular sides of said reinforcing rib are connected to the internal plate surface of said adaptation bracket and the inner surface of said extension connecting base.

Specifically, said fluorescent lamp tube holder comprises a bracket with a recess and a cylindrical pin connecting turntable which is rotatably installed in said recess. Said recess has a cylindrical surface internal wall. Said bracket is processed with a pin leading-in groove which forms a vertical wall of said recess, and said pin connecting turntable is also processed with a pin slot which runs through said pin connecting turntable.

The invention can also solve the said technical issues with the following technical proposals:

A LED illumination device (including a LED lamp tube) adapted to a fluorescent lamp tube holder is designed and manufactured. Said LED lamp tube includes a light transmission tube with a built-in LED lamp body. Said fluorescent lamp tube holder is suitable for installing a fluorescent lamp tube and provides a power interface for said fluorescent lamp tube. Said fluorescent lamp tube includes a straight lamp tube body and two interface covers arranged at both ends of said lamp tube body respectively. At least one interface cover is provided with two cylindrical conductive pins which axially extend from such interface cover along said lamp tube body. Especially, said LED illumination device also includes a LED lamp tube holder. Said LED lamp tube holder comprises an adaptation bracket and a lamp tube holding clip which is connected to said adaptation bracket. Said lamp tube holding clip has a circular-arc cylindrical holding surface, thereby enabling being clamped to the outer wall of a light transmission tube of said LED lamp tube. A cylindrical pin which axially extends from the LED lamp tube holder along said light transmission tube is arranged on said adaptation bracket; the shape of said pin is the same as that of an electrically-conductive pin of said fluorescent lamp tube, thereby enabling the LED lamp tube holder to be arranged in the fluorescent lamp tube holder.

To ensure that said lamp tube holding clip firmly clamps a light transmission tube of said LED lamp tube, the cross section of the holding surface of said lamp tube holding clip presents a circular arc shape, and the central angle "α" between radius lines which pass through two endpoints of such circular arc is less than 170 degree.

Specifically, said LED lamp tube holder also includes an extension connecting base with a circular-arc cylindrical inner surface. Said extension connecting base is formed by axially extending the bottom of a lamp tube holding clip along the holding surface of such lamp tube holding clip. The end of said extension connecting base is connected to said adaptation bracket.

More specifically, the holding surface of said lamp tube holding clip and the inner surface of said extension connecting base have a circular-arc cross section, and the central angle of the cross section of said holding surface is greater than that of said inner surface. The central angle of said cross section refers to the included angle between radius lines which pass through two endpoints of such circular arc.

In order for the power line of a LED lamp tube to be easily laid, said adaptation bracket assumes a flat plate shape and the bottom surface of said adaptation bracket presents a circular-arc cylindrical surface shape so that the bottom surface of said adaptation bracket is connected to the inner surface at the end of said extension connecting base, thereby forming two grooves among said adaptation bracket, said extension connecting base and said lamp tube holding clip.

To enhance the mechanical strength, said LED lamp tube holder also includes a triangular prism-shaped reinforcing rib, the cross section of which presents a right triangle shape. Two mutually perpendicular sides of said reinforcing rib are connected to the internal plate surface of said adaptation bracket and the inner surface of said extension connecting base.

Specifically, said fluorescent lamp tube holder comprises a bracket with a recess and a cylindrical pin connecting turntable which is rotatably installed in said recess. Said recess has a cylindrical surface internal wall. Said bracket is processed with a pin leading-in groove which forms a vertical wall of said recess, and said pin connecting turntable is also processed with a pin slot which runs through said pin connecting turntable.

For a LED lamp tube, specifically, said LED lamp tube also includes a cover used to seal both ends of said light transmission tube respectively, and the power line of said LED lamp body goes out of a cover.

Said LED lamp body adopts a composite LED lamp body, including a base plate and at least a light-emitting unit electrically connected to such base plate.

Said LED light-emitting unit includes at least a LED illuminant.

Compared with the prior art, the technical effects of the present invention are as follows:

1. This invention does not need to dismantle components of an original fluorescent lamp holder, a lamp shade and the like; the LED lamp tube can be arranged on the basis of the original LED lamp tube holder; compared with the prior art where a tubular LED illumination lamp is used to replace a fluorescent illumination lamp, the operation in the present invention is simple and quick.

2. In addition to the replacement of fluorescent lamp tube, this invention does not need to discard or recycle other accessories for fluorescent lamp tube; compared with the prior art where a tubular LED illumination lamp is used to replace a fluorescent illumination lamp, the replacement cost in the present invention is reduced, enabling the replacement to comply with the energy saving and environmental protection requirements.

MODE OF CARRYING OUT THE INVENTION MODEL

To further illustrate the principle and structure of the invention, the invention is further described in detail in accordance with the preferable embodiments shown in the figures.

The present invention discloses a method for adapting a LED lamp tube 2 to a fluorescent lamp tube holder 9. Said fluorescent lamp tube holder 9 is suitable for installing a fluorescent lamp tube 8 and provides a power interface for said fluorescent lamp tube 8. The fluorescent lamp tube 8 includes a straight lamp tube body 81 and two interface covers 82 arranged at both ends of said lamp tube body 81 respectively. At least one interface cover 82 is provided with two cylindrical conductive pins 83 which axially extend from such interface cover (82) along said lamp tube body 81. Said LED lamp tube 2 includes a light transmission tube 21 with a built-in LED lamp body. Said method consists of the following steps:

A. As shown in FIGS. 1 to 3 and FIG. 7, at least one LED lamp tube holder 1 including an adaptation bracket 11 and a lamp tube holding clip 12 is used; said lamp tube holding clip 12 is used to clamp the outer wall of a light transmission tube 21 of said LED lamp tube 2, and said adaptation bracket 11 is provided with a cylindrical pin 13 which axially extends from said LED lamp tube holder 1 along said light transmission tube 21; the shape of said pin 13 is the same as that of an electrically-conductive pin 83 of said fluorescent lamp tube 8 as shown in FIG. 16.

Figure 7:
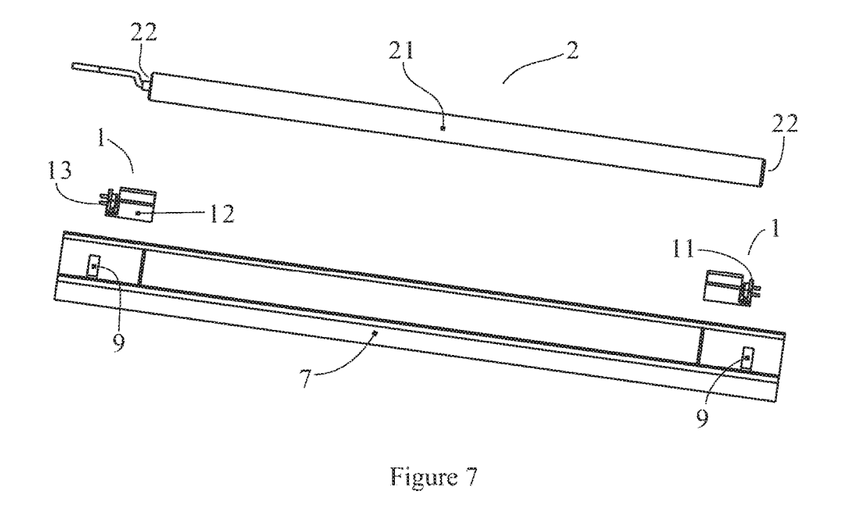
FIG. 7 is a schematic diagram for axonometric projection of said preferred embodiment in a decomposition state.

B. As shown in FIG. 7, said LED lamp tube is installed on the fluorescent lamp tube holder through said LED lamp tube holder described in Step A.

This invention does not need to dismantle components of an original fluorescent lamp holder, a lamp shade and the like; the LED lamp tube can be arranged on the basis of the original LED lamp tube holder; compared with the prior art where a tubular LED illumination lamp is used to replace a fluorescent illumination lamp, the operation in the present invention is simple and quick. Also, in addition to the replacement of fluorescent lamp tube, this invention does not need to discard or recycle other accessories for fluorescent lamp tube; compared with the prior art where a tubular LED illumination lamp is used to replace a fluorescent illumination lamp, the replacement cost in the present invention is reduced, enabling the replacement to comply with the energy saving and environmental protection requirements.

In order to implement the above method, the present invention also discloses a LED lamp tube holder 1 for adapting a LED lamp tube to a fluorescent lamp tube holder. As shown in FIGS. 1 to 5, said fluorescent lamp tube holder 9 is suitable for installing a fluorescent lamp tube 8 and provides a power interface for said fluorescent lamp tube 8. The fluorescent lamp tube 8 includes a straight lamp tube body 81 and two interface covers 82 arranged at both ends of said lamp tube body 81 respectively. At least one interface cover 82 is provided with two cylindrical conductive pins 83 which axially extend from such interface cover 82 along said lamp tube body 81. Said LED lamp tube 2 includes a light transmission tube 21 with a built-in LED lamp body. Said LED lamp tube holder 1 comprises an adaptation bracket 11 and a lamp tube holding clip 12 which is connected to the adaptation bracket 11. Said lamp tube holding clip 12 has a circular-arc cylindrical holding surface 121, thereby enabling being clamped to the outer wall of a light transmission tube 21 of said LED lamp tube 2. A cylindrical pin 13 which axially extends from the LED lamp tube holder 1 along said light transmission tube 21 is arranged on said adaptation bracket 11; the shape of said pin 13 is the same as that of an electrically-conductive pin 83 of said fluorescent lamp tube 8, thereby enabling the LED lamp tube holder 1 to be arranged in the fluorescent lamp tube holder 9.

Figure 3:
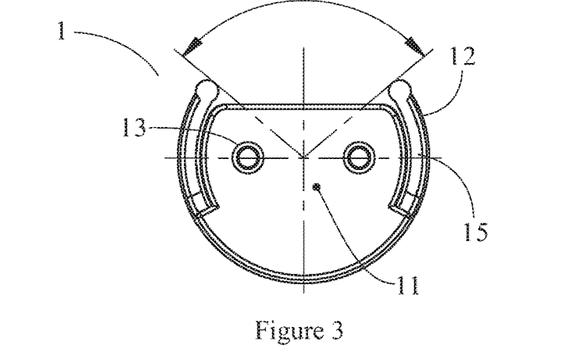
FIG. 3 is a left view for the LED lamp tube holder 1 in said preferred embodiment, where one side of said adaptation bracket 11 faces a viewer.

To ensure that said lamp tube holding clip 2 firmly clamps a light transmission tube 21 of said LED lamp tube 2, in a preferred embodiment of the present invention, as shown in FIG. 3, the cross section of the holding surface 121 of said lamp tube holding clip 12 presents a circular arc shape, and the central angle "α" between radius lines which pass through two endpoints of such circular arc is less than 170 degree.

Figure 1:
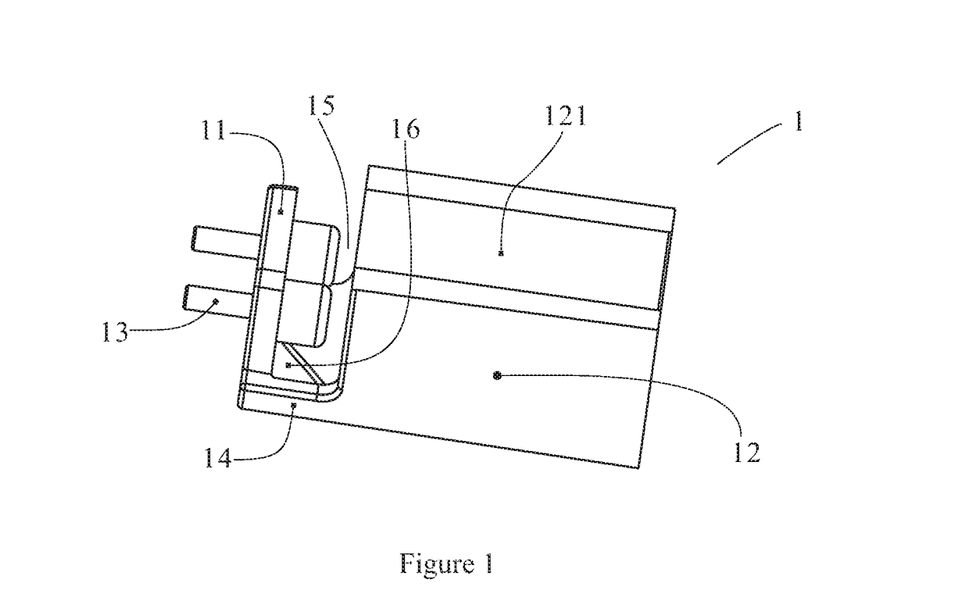
FIG. 1 is a schematic diagram for axonometric projection of said LED lamp tube holder 1 in a preferred embodiment of the present invention.
Figure 2:
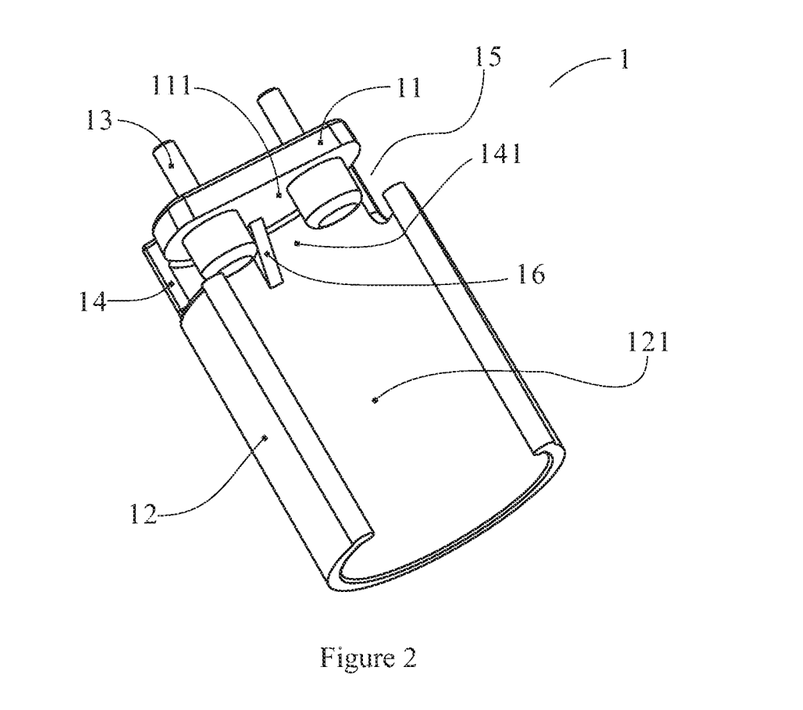
FIG. 2 is an another schematic diagram for axonometric projection of said LED lamp tube holder 1 in a preferred embodiment of the present invention.

In a preferred embodiment of the present invention, as shown in FIG. 1 and FIG. 2, the concrete structure for implementing the connection of said adaptation bracket 11 with said lamp tube holding clip 12 is that said LED lamp tube holder 1 also includes an extension connecting base 14 with a circular-arc cylindrical inner surface 141. Said extension connecting base 14 is formed by axially extending the bottom of a lamp tube holding clip 12 along the holding surface 121 of such lamp tube holding clip 12. The end of said extension connecting base 14 is connected to said adaptation bracket 11. This structure ensures solid connection of an adaptation bracket 11 with a lamp tube holding clip 12, enabling a LED lamp tube holder 1 to be rotated in a fluorescent lamp tube holder 9.

In order for a lamp tube holding clip 12 to securely connect an adaptation bracket 11 through an extension connecting base 14 as well as to clamp a light transmission tube 21 through elastic deformation when a LED lamp tube 2 is installed, in a preferred embodiment of the present invention, as shown in FIGS. 1 and 2, the holding surface 121 of said lamp tube holding clip 12 and the inner surface 141 of said extension connecting base 14 have a circular-arc cross section, and the central angle of the cross section of said holding surface 121 is greater than that of said inner surface. The central angle of said cross section refers to an included angle between radius lines which pass through two endpoints of such circular arc. That is, an extension connecting base 14 is not connected to a whole of a lamp tube holding clip 12 but connected to a part of a lamp tube holding clip 12, ensuring that a lamp tube holding clip 12 has a certain elasticity to adapt a LED lamp tube 2 to a LED lamp tube holder 1.

Figure 6:
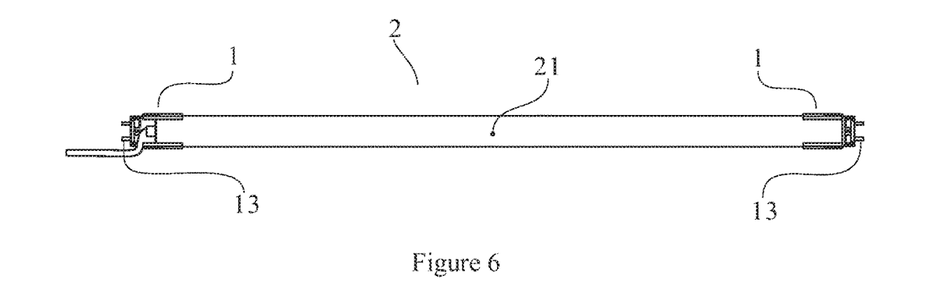
FIG. 6 is a front view for orthographic projection of the LED illumination device in said preferred embodiment.

In order for the power line of a LED lamp tube 1 to be easily laid, in a preferred embodiment of the present invention, as shown in FIGS. 1, 2 and 6, said adaptation bracket 11 assumes a flat plate shape and the bottom surface of said adaptation bracket 11 presents a circular-arc cylindrical surface shape so that the bottom surface of said adaptation bracket 11 is connected to the inner surface 141 at the end of said extension connecting base 14, thereby forming two grooves 15 among said adaptation bracket, said extension connecting base 14 and said lamp tube holding clip 12. When a LED lamp tube 2 is installed in said LED lamp tube holder 1, the power line of said LED lamp tube 2 can go out of said LED lamp tube holder 1 through a groove 15 to prevent the rigid bending of the power line of said LED lamp tube 2 from the damage of said LED lamp tube 2.

To enhance the mechanical strength, in a preferred embodiment of the present invention, as shown in FIGS. 1 and 2, said LED lamp tube holder 1 also includes a triangular prism-shaped reinforcing rib 16, the cross section of which presents a right triangle shape. Two mutually perpendicular sides of said reinforcing rib 16 are connected to the internal plate surface of said adaptation bracket 11 and the inner surface 141 of said extension connecting base 14.

Figure 4:
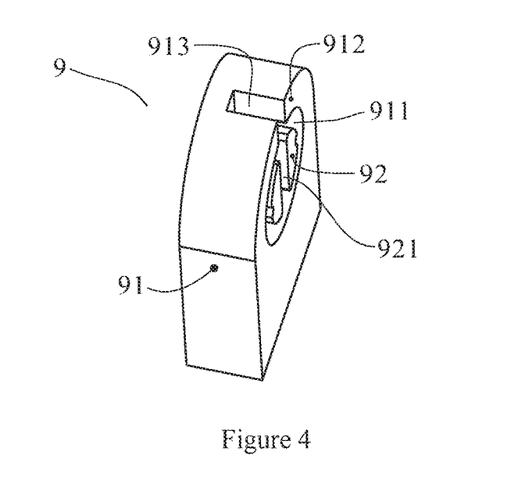
FIG. 4 is a schematic diagram for axonometric projection of said fluorescent lamp tube holder 9 in said preferred embodiment.
Figure 5:
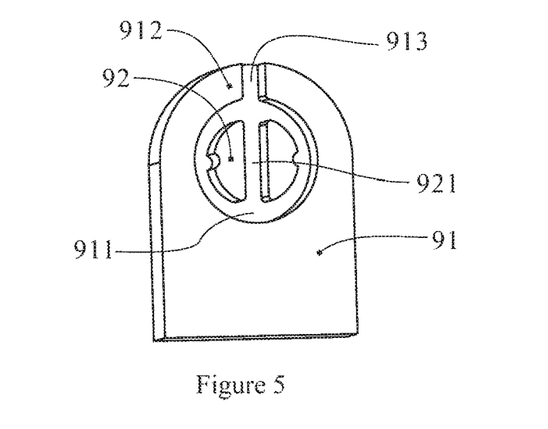
FIG. 5 is an another schematic diagram for axonometric projection of said fluorescent lamp tube holder 9 in said preferred embodiment.

In a preferred embodiment of the present invention, said fluorescent lamp tube holder 9 has the following concrete structure: as shown in FIGS. 4 and 5, said fluorescent lamp tube holder 9 comprises a bracket 91 with a recess 911 and a cylindrical pin connecting turntable 92 which is rotatably installed in said recess 911. Said recess 91 has a cylindrical surface internal wall. Said bracket 91 is processed with a pin leading-in groove 913 which forms a vertical wall 912 of said recess 911, and said pin connecting turntable 92 is also processed with a pin slot 921 which runs through said pin connecting turntable 92. The above concrete structure of said fluorescent lamp tube holder enables said fluorescent lamp tube 2 installed on said fluorescent lamp tube holder 9 to be more reliable and durable.

Moreover, the present invention provides an illumination device adapted to a fluorescent lamp tube holder on the basis of said LED lamp tube holder 1, as shown in FIGS. 1 to 6, including a LED lamp tube 2. Said LED lamp tube 2 includes a light transmission tube 21 with a built-in LED lamp body. Said fluorescent lamp tube holder 9 is suitable for installing a fluorescent lamp tube 8 and provides a power interface for said fluorescent lamp tube 8. The fluorescent lamp tube 8 includes a straight lamp tube body 81 and two interface covers 82 arranged at both ends of said lamp tube body 81 respectively. At least one interface cover 82 is provided with two cylindrical conductive pins 83 which axially extend from such interface cover 82 along said lamp tube body 81. Especially, said LED illumination device also includes a LED lamp tube holder 1. Said LED lamp tube holder 1 comprises an adaptation bracket 11 and a lamp tube holding clip 12 which is connected to the adaptation bracket 11. Said lamp tube holding clip 12 has a circular-arc cylindrical holding surface 121, thereby enabling being clamped to the outer wall of a light transmission tube 21 of said LED lamp tube 2. A cylindrical pin 13 which axially extends from the LED lamp tube holder 1 along said light transmission tube 21 is arranged on said adaptation bracket 11; the shape of said pin 13 is the same as that of an electrically-conductive pin 83 of said fluorescent lamp tube 8, thereby enabling the LED lamp tube holder 1 to be arranged in the fluorescent lamp tube holder 9.

For a LED lamp tube 2, in a preferred embodiment of the present invention, as shown in FIG. 7, said LED lamp tube 2 also includes a cover 22 used to seal both ends of said light transmission tube 21 respectively, and the power line of said LED lamp body goes out of a cover 22.

In a preferred embodiment of the present invention, said LED lamp body adopts a composite LED lamp body including a base plate and at least a light-emitting unit electrically connected to such base plate, that is, multiple LED illuminants are used to combine into an integral whole according to a certain configuration method.

Said LED light-emitting unit includes at least a LED illuminant. When said LED light-emitting unit has only a LED illuminant, the LED illuminant is required to be electrically connected to a base plate by welding or surface mounting. When said LED light-emitting unit has more than two LED illuminants, these LED illuminants are electrically connected to a circuit board through integration, that is, they are integrated in order to achieve a better illumination effect.

As stated above, to ensure that said lamp tube holding clip 2 firmly clamps a light transmission tube 21 of said LED lamp tube 2, in a preferred embodiment of the present invention, as shown in FIG. 3, the cross section of the holding surface 121 of said lamp tube holding clip 12 presents a circular arc shape, and the central angle "α" between radius lines which pass through two endpoints of such circular arc is less than 170 degree.

In a preferred embodiment of the present invention, as shown in FIG. 1 and FIG. 2, the concrete structure for implementing the connection of said adaptation bracket 11 with said lamp tube holding clip 12 is that said LED lamp tube holder 1 also includes an extension connecting base 14 with a circular-arc cylindrical inner surface 141. Said extension connecting base 14 is formed by axially extending the bottom of a lamp tube holding clip 12 along the holding surface 121 of such lamp tube holding clip 12. The end of said extension connecting base 14 is connected to said adaptation bracket 11.

In order for a lamp tube holding clip 12 to securely connect an adaptation bracket 11 through an extension connecting base 14 as well as to clamp a light transmission tube 21 through elastic deformation when a LED lamp tube 2 is installed, in a preferred embodiment of the present invention, as shown in FIGS. 1 and 2, the holding surface 121 of said lamp tube holding clip 12 and the inner surface 141 of said extension connecting base 14 have a circular-arc cross section, and the central angle of the cross section of said holding surface 121 is greater than that of said inner surface. The central angle of said cross section refers to the included angle between radius lines which pass through two endpoints of such circular arc.

In order for the power line of a LED lamp tube 1 to be easily laid, in a preferred embodiment of the present invention, as shown in FIGS. 1, 2 and 6, said adaptation bracket 11 assumes a flat plate shape and the bottom surface of said adaptation bracket 11 presents a circular-arc cylindrical surface shape so that the bottom surface of said adaptation bracket 11 is connected to the inner surface at the end of said extension connecting base 14, thereby forming two grooves 15 among said adaptation bracket, said extension connecting base 14 and said lamp tube holding clip 12.

To enhance the mechanical strength, in a preferred embodiment of the present invention, as shown in FIGS. 1 and 2, said LED lamp tube holder 1 also includes a triangular prism-shaped reinforcing rib 16, the cross section of which presents a right triangle shape. Two mutually perpendicular sides of said reinforcing rib 16 are connected to the internal plate surface of said adaptation bracket 11 and the inner surface 141 of said extension connecting base 14.

In a preferred embodiment of the present invention, said fluorescent lamp tube holder 9 has the following concrete structure: as shown in FIGS. 4 and 5, said fluorescent lamp tube holder 9 comprises a bracket 91 with a recess 911 and a cylindrical pin connecting turntable 92 which is rotatably installed in said recess 911. Said recess 91 has a cylindrical surface internal wall. Said bracket 91 is processed with a pin leading-in groove 913 which forms a vertical wall 912 of said recess 911, and said pin connecting turntable 92 is also processed with a pin slot 921 which runs through said pin connecting turntable 92.

Based on the above-mentioned LED lamp tube holder 1 and LED illumination device, in order to implement the above method in Steps A~B, two specific assembly modes can be used to install a LED lamp tube 2 on a fluorescent lamp tube holder 9.

Figure 8:
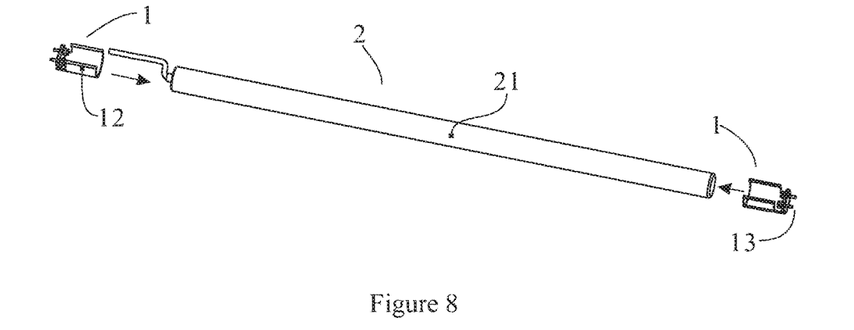
FIG. 8 is an assembly diagram in Assembly Mode 1 of said preferred embodiment.

In Assembly Mode 1 in a preferred embodiment of the present invention, Step B includes the following sub-steps:

B11. As shown in FIG. 8, in the direction of arrow, at least one end of a light transmission tube 21 of said LED lamp tube 2 is embedded or clamped in a lamp tube holding clip 12 of said LED lamp tube holder 1, ensuring that said lamp tube holding clip 12 firmly clamps said light transmission tube 21.

B12. Said LED lamp tube 2 which clamps the LED lamp tube holder 1 is installed in said fluorescent lamp tube holder 1 through the pin 13 of an adaptation bracket 11 of said LED lamp tube holder 1.

As stated above, in a preferred embodiment of the present invention, as shown in FIGS. 4 and 5, said fluorescent lamp tube holder 9 comprises a bracket 91 with a recess 911 and a cylindrical pin connecting turntable 92 which is rotatably installed in said recess 911. Said recess 911 has a cylindrical surface internal wall. Said bracket 91 is processed with a pin leading-in groove 913 which forms a vertical wall 912 of said recess 911, and said pin connecting turntable 92 is also processed with a pin slot 921 which runs through said pin connecting turntable 92. For said fluorescent lamp tube holder 9, Step B12 has the following sub-steps:

B121. Said pin connecting turntable 92 is rotated to enable its pin slot 921 and said pin leading-in groove 913 on the bracket 91 to interpenetrate.

B122. The pin 13 of an adaptation bracket 11 of said LED lamp tube holder 1 is pressed from the pin leading-in groove of a bracket 91 of said fluorescent lamp holder 9 into a pin slot 921 of said pin connecting turntable 92.

B123. The LED lamp tube 2 which clamps said LED lamp tube holder 1 is rotated to make the pin leading-in groove 913 of a bracket 91 of said fluorescent lamp holder 9 and the pin slot 921 of said pin connecting turntable 92 unable to interpenetrate so that said LED lamp tube 2 is installed in said fluorescent lamp tube holder 9.

In Assembly Mode 2 in a preferred embodiment of the present invention, Step B also includes the following sub-steps:

B21. Said LED lamp tube holder 1 is installed in said fluorescent lamp tube holder 9 through the pin 13 of an adaptation bracket 11 of said LED lamp tube holder 1.

In a preferred embodiment of the present invention, said fluorescent lamp tube holder 9 comprises a bracket 91 with a recess 911 and a cylindrical pin connecting turntable 92 which is rotatably installed in said recess 911. Said recess 911 has a cylindrical surface internal wall. Said bracket 91 is processed with a pin leading-in groove 913 which forms a vertical wall 912 of said recess 911, and said pin connecting turntable 92 is also processed with a pin slot 921 which runs through said pin connecting turntable 92. In this case, Step B21 includes the following sub-steps:

B211. Said pin connecting turntable 92 is rotated to enable its pin slot 921 and said pin leading-in groove 921 on the bracket 91 to interpenetrate.

Figure 9:
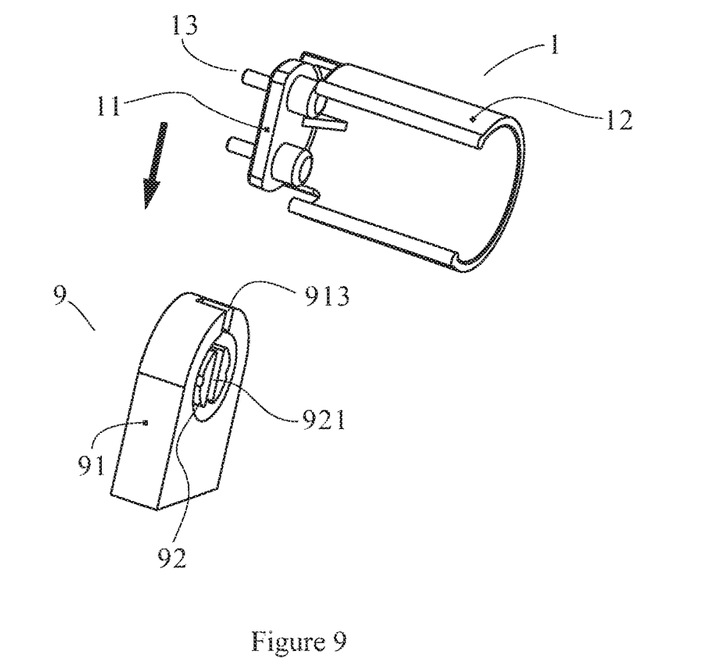
FIG. 9 is the first assembly diagram in Assembly Mode 2 of said preferred embodiment.
Figure 10:
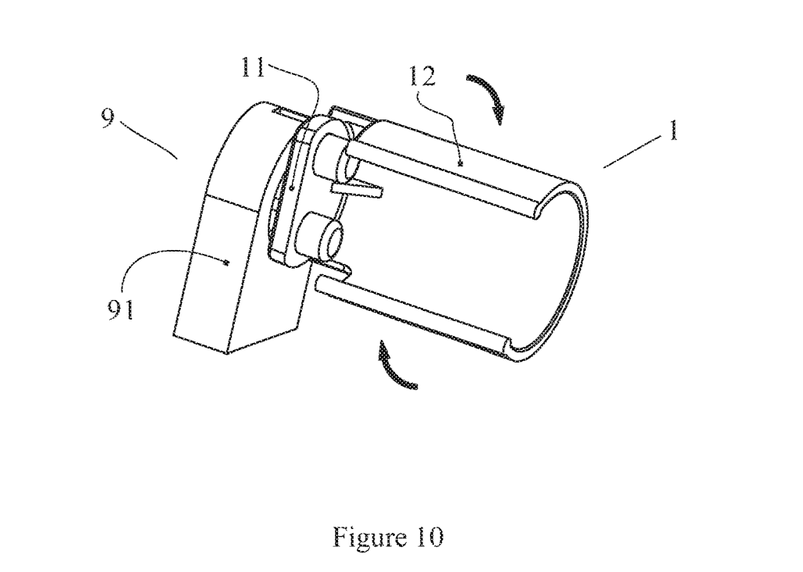
FIG. 10 is the second assembly diagram in Assembly Mode 2 of said preferred embodiment.

B212. As shown in FIG. 9, in the direction of arrow, the pin 13 of an adaptation bracket 11 of said LED lamp tube holder 1 is pressed from the pin leading-in groove of a bracket 91 of said fluorescent lamp holder 9 into a pin slot 921 of said pin connecting turntable 92, as shown in FIG. 10.

Figure 11:
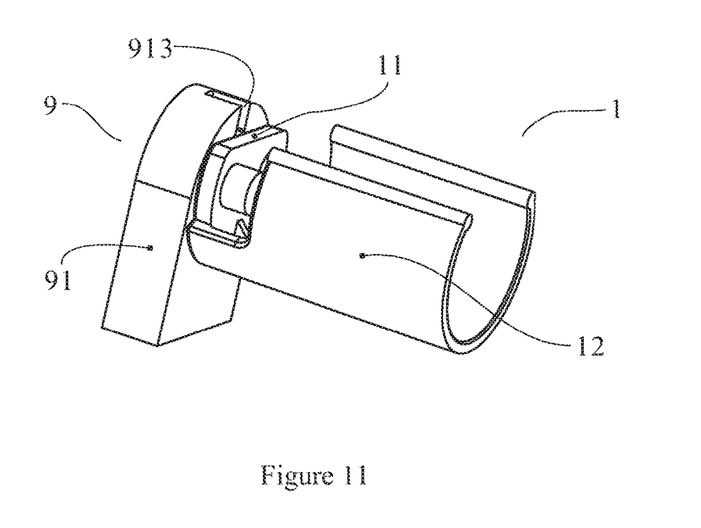
FIG. 11 is the third assembly diagram in Assembly Mode 2 of said preferred embodiment.
Figure 12:
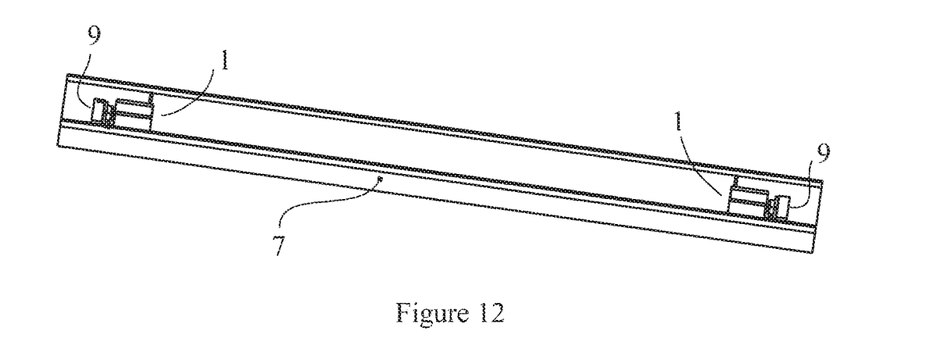
FIG. 12 is the fourth assembly diagram in Assembly Mode 2 of said preferred embodiment.

B213. As indicated by the arrow in FIG. 10, a LED lamp tube holder 1 is rotated to make the pin leading-in groove 913 of a bracket 91 of said fluorescent lamp holder 9 and the pin slot 921 of said pin connecting turntable 92 unable to interpenetrate as shown in FIG. 11 so that a LED lamp tube holder 1 is installed in said fluorescent lamp tube holder 9; in a preferred embodiment of the present invention, as shown in FIG. 12, two LED lamp tube holders 1 are installed in two fluorescent lamp tube holders 9 arranged in a lamp shade 7.

Figure 13:
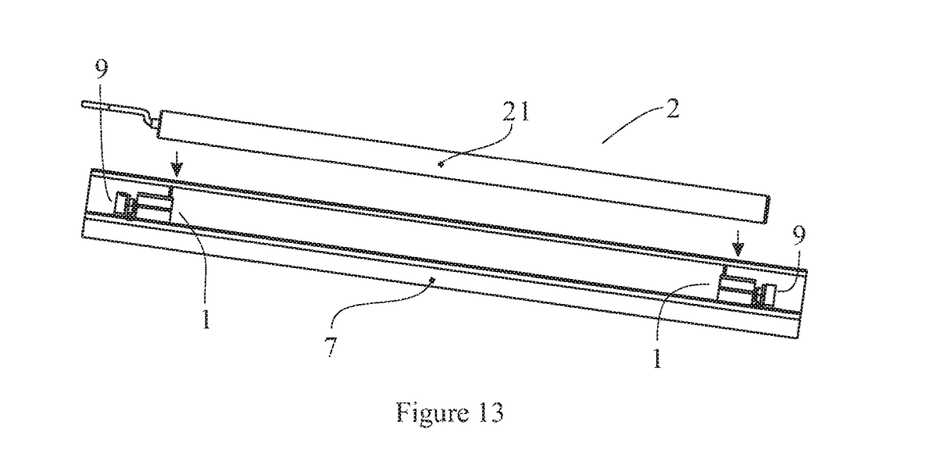
FIG. 13 is the fifth assembly diagram in Assembly Mode 2 of said preferred embodiment.
Figure 14:
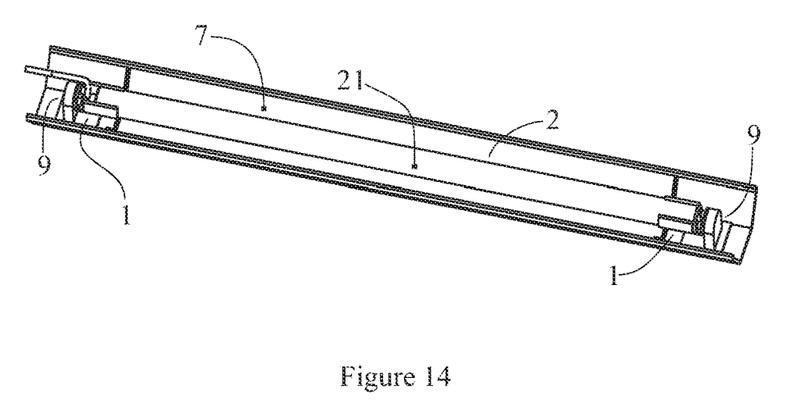
FIG. 14 is the sixth assembly diagram in Assembly Mode 2 of said preferred embodiment.
Figure 15:
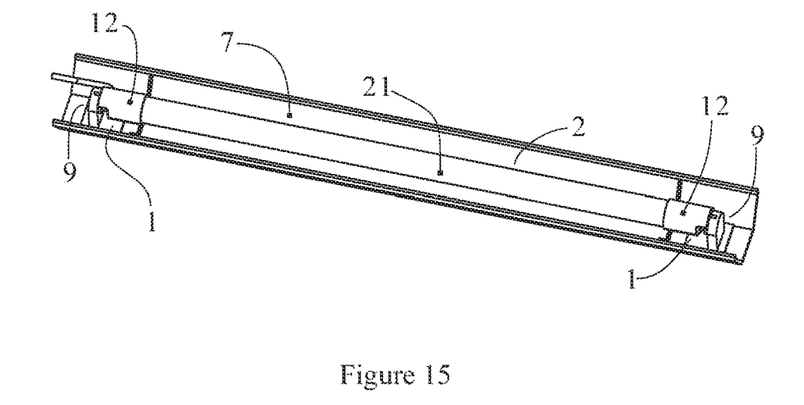
FIG. 15 is the seventh assembly diagram in Assembly Mode 2 of said preferred embodiment.

After Steps B211 to B213, the following sub-steps are performed:

B22. In a preferred embodiment of the present invention, as indicated by the arrow in FIG. 13, both ends of a light transmission tube 21 of a LED lamp tube 2 are clamped in the lamp tube holding clip 12 of said LED lamp tube holder 1 in Step B21, as shown in FIG. 14; by rotating said LED lamp tube 2, the lamp tube holding clips 12 of two LED lamp tube holders 1 are rotated in the direction of the clip opening which faces a lamp shade 7, thereby ensuring that said lamp tube holding clip 12 firmly clamps said light transmission tube 21 and said LED lamp tube 2 are not enabled to fall away from said LED lamp tube holder 1. In a preferred embodiment of the present invention, a LED lamp tube 2 is installed between both fluorescent lamp tube holders 9. When said LED lamp tube 2 is installed in a fluorescent lamp tube holder 9, it is only necessary to install one end of said LED lamp tube 2 in a LED lamp tube holder 1. In this case, a LED lamp tube 2 can be clamped in a lamp tube holding clip 12, whereas for a lamp tube holding clip 12 made of elastic material, a LED lamp tube 2 can also be pressed into a lamp tube holding clip 12. Consequently, a light transmission tube 21 of a LED lamp tube 2 can be either embedded or clamped in a lamp tube holding clip 12 of a LED lamp tube holder 1; and a LED lamp tube 2 can be installed either between both fluorescent lamp tube holders 9 or on a fluorescent lamp tube holder 9.

What is claimed is:

1. A LED lamp tube holder for adapting a LED lamp tube to a fluorescent lamp tube holder, wherein
said fluorescent lamp tube holder is suitable for installing a fluorescent lamp tube and provides a power interface for said fluorescent lamp tube;
said fluorescent lamp tube includes a straight lamp tube body and two interface covers arranged at both ends of said lamp tube body respectively, wherein at least one interface cover is provided with two cylindrical conductive pins which axially extend from such interface cover along said lamp tube body;
said LED lamp tube includes a light transmission tube with a built-in LED lamp body;
said LED lamp tube holder comprises an adaptation bracket and a lamp tube holding clip which is connected to the adaptation bracket, wherein said lamp tube holding clip has a circular-arc cylindrical holding surface, thereby enabling being clamped to the outer wall of a light transmission tube of said LED lamp tube;
a cylindrical pin which axially extends from the LED lamp tube holder along said light transmission tube is arranged on said adaptation bracket wherein the shape of said cylindrical pin is the same as that of an electrically-conductive pin of said fluorescent lamp tube, thereby enabling the LED lamp tube holder to be arranged in the fluorescent lamp tube holder;
the LED lamp tube holder further comprises an extension connecting base with a circular-arc cylindrical inner surface, wherein said extension connecting base is formed by axially extending a bottom of a lamp tube holding clip along the holding surface of such lamp tube holding clip, the end of said extension connecting base connected to said adaptation bracket;
wherein a cross section of the holding surface of said lamp tube holding clip presents a circular arc shape, and a central angle "α" between radius lines which pass through two endpoints of such circular arc is less than 170 degree.

2. The LED lamp tube holder for adapting a LED lamp tube to a fluorescent lamp tube holder according to claim 1, wherein:
the holding surface of said lamp tube holding clip and the inner surface of said extension connecting base have a circular-arc cross section, and
the central angle of the cross section of said holding surface is greater than a central angle of said inner surface;
wherein the central angle of said cross section refers to an included angle between radius lines which pass through two endpoints of such circular arc.

3. The LED lamp tube holder for adapting a LED lamp tube to a fluorescent lamp tube holder according to claim 2, wherein:
said adaptation bracket assumes a flat plate shape and a bottom surface of said adaptation bracket presents a circular-arc cylindrical surface shape so that the bottom surface of said adaptation bracket is connected to the inner surface at the end of said extension connecting base, thereby forming two grooves among said adaptation bracket, said extension connecting base and said lamp tube holding clip.

4. The LED lamp tube holder for adapting a LED lamp tube to a fluorescent lamp tube holder according to claim 2, wherein:
the LED lamp tube holder further comprises a triangular prism-shaped reinforcing rib, a cross section of which presents a right triangle shape;
wherein two mutually perpendicular sides of said reinforcing rib are connected to the internal plate surface of said adaptation bracket and the inner surface of said extension connecting base.

5. A LED illumination device adapted to a fluorescent lamp tube holder, comprising a LED lamp tube, wherein
said LED lamp tube includes a light transmission tube with a built-in LED lamp body;
said fluorescent lamp tube holder is suitable for installing a fluorescent lamp tube and provides a power interface for said fluorescent lamp tube;
said fluorescent lamp tube comprises a straight lamp tube body and two interface covers arranged at both ends of said lamp tube body respectively; at least one interface cover is provided with two cylindrical conductive pins which axially extend from such interface cover along said lamp tube body;
the LED illumination device further comprises a LED lamp tube holder, which comprises an adaptation bracket and a lamp tube holding clip which is connected to the adaptation bracket;
said lamp tube holding clip has a circular-arc cylindrical holding surface, thereby enabling being clamped to the outer wall of a light transmission tube of said LED lamp tube;
a cylindrical pin which axially extends from the LED lamp tube holder along said light transmission tube is arranged on said adaptation bracket, wherein the shape of said cylindrical pin is the same as that of an electrically-conductive pin of said fluorescent lamp tube, thereby enabling the LED lamp tube holder to be arranged in the fluorescent lamp tube holder;
said LED lamp tube holder further comprises an extension connecting base with a circular-arc cylindrical inner surface, wherein said extension connecting base is formed by axially extending a bottom of a lamp tube holding clip along the holding surface of such lamp tube holding clip, the end of said extension connecting base connected to said adaptation bracket,
wherein a cross section of the holding surface of said lamp tube holding clip presents a circular arc shape, and a central angle "α" between radius lines which pass through two endpoints of such circular arc is less than 170 degree.

6. The LED illumination device adapted to a fluorescent lamp tube holder according to claim 5, wherein:
the holding surface of said lamp tube holding clip and the inner surface of said extension connecting base have a circular-arc cross section, and
the central angle of the cross section of said holding surface is greater than a central angle of said inner surface;
wherein the central angle of said cross section refers to an included angle between radius lines which pass through two endpoints of such circular arc.

7. The LED illumination device adapted to a fluorescent lamp tube holder according to claim 6, wherein:
said adaptation bracket assumes a flat plate shape and a bottom surface of said adaptation bracket presents a circular-arc cylindrical surface shape so that the bottom surface of said adaptation bracket is connected to the inner surface at the end of said extension connecting base, thereby forming two grooves among said adaptation bracket, said extension connecting base and said lamp tube holding clip.

8. The LED illumination device adapted to a fluorescent lamp tube holder according to claim 7, wherein:
said LED lamp tube holder further comprises a triangular prism-shaped reinforcing rib, a cross section of which presents a right triangle shape;
wherein two mutually perpendicular sides of said reinforcing rib are connected to the internal plate surface of said adaptation bracket and the inner surface of said extension connecting base.

* * * * *